US012078989B2

(12) United States Patent
Gariepy

(10) Patent No.: US 12,078,989 B2
(45) Date of Patent: *Sep. 3, 2024

(54) SYSTEMS AND METHODS FOR REMOTE VIEWING OF SELF-DRIVING VEHICLES

(71) Applicant: Clearpath Robotics Inc., Kitchener (CA)

(72) Inventor: Ryan Christopher Gariepy, Kitchener (CA)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,279

(22) Filed: Apr. 5, 2023

(65) Prior Publication Data

US 2023/0324906 A1 Oct. 12, 2023

Related U.S. Application Data

(63) Continuation of application No. 17/475,684, filed on Sep. 15, 2021, now Pat. No. 11,650,583, which is a continuation of application No. 16/288,228, filed on Feb. 28, 2019, now Pat. No. 11,144,051.

(60) Provisional application No. 62/636,245, filed on Feb. 28, 2018.

(51) Int. Cl.
*G05D 1/00* (2006.01)
*H04N 5/272* (2006.01)
*H04N 7/18* (2006.01)

(52) U.S. Cl.
CPC ......... *G05D 1/0038* (2013.01); *G05D 1/0231* (2013.01); *G05D 1/0276* (2013.01); *H04N 5/272* (2013.01); *H04N 7/183* (2013.01); *H04N 7/185* (2013.01)

(58) Field of Classification Search
CPC .. G05D 1/0038; G05D 1/0231; G05D 1/0276; G05D 2201/0216; H04N 7/183; H04N 7/185; H04N 5/272
USPC .......................................................... 701/2
See application file for complete search history.

(56) References Cited

U.S. PATENT DOCUMENTS

| | | | |
|---|---|---|---|
| 9,910,432 B1* | 3/2018 | Chambers | ............ G05D 1/0022 |
| 2007/0061040 A1 | 3/2007 | Augenbraun et al. | |
| 2011/0288684 A1 | 11/2011 | Farlow et al. | |
| 2012/0041593 A1 | 2/2012 | Ichinose et al. | |

(Continued)

*Primary Examiner* — Muhammad Shafi

(57) ABSTRACT

A system for remote viewing and control of self-driving vehicles includes: an execution subsystem for deployment at an execution location containing a self-driving vehicle. The execution subsystem includes: a capture assembly to capture multimedia data depicting the execution location, and a server to receive the multimedia data and transmit the multimedia data for presentation at an operator location remote from the execution location. The server relays operational commands and operational status data between the self-driving vehicle and the operator location. The system includes an operator subsystem for deployment at the operator location, including: a display assembly, and a computing device to: (a) establish a connection with the server; (b) receive the multimedia data from the server and control the display assembly to present the multimedia data; and (c) receive control commands and transmit the control commands to the server for execution by the self-driving vehicle.

18 Claims, 6 Drawing Sheets

(56) References Cited

U.S. PATENT DOCUMENTS

| | | |
|---|---|---|
| 2014/0365258 A1 | 12/2014 | Vestal et al. |
| 2015/0103170 A1 | 4/2015 | Nelson et al. |
| 2015/0190925 A1 | 7/2015 | Hoffman et al. |
| 2016/0139594 A1* | 5/2016 | Okumura .............. B60W 30/00 701/2 |
| 2017/0203446 A1 | 7/2017 | Dooley et al. |
| 2018/0321687 A1* | 11/2018 | Chambers .......... G06Q 30/0261 |

* cited by examiner

SYSTEMS AND METHODS FOR REMOTE VIEWING OF SELF-DRIVING VEHICLES

CROSS-REFERENCE TO RELATED PATENT APPLICATION

The application is a continuation of U.S. patent application Ser. No. 17/475,684, filed on Sep. 15, 2021 (which has since issued as U.S. Pat. No. 11,650,583 on May 16, 2023), which is a continuation of U.S. patent application Ser. No. 16/288,228, filed on Feb. 28, 2019 (which has since issued as U.S. Pat. No. 11,144,051 on Oct. 12, 2021), which claims the benefit of U.S. Provisional Patent Application No. 62/636,245, filed on Feb. 28, 2018. The complete disclosure of each of U.S. patent application Ser. No. 17/475,684, U.S. patent application Ser. No. 16/288,228, and U.S. Provisional Patent Application No. 62/636,245 is incorporated herein by reference.

FIELD

The specification relates generally to self-driving vehicles, and specifically to a system and method for remote viewing and control of self-driving vehicles.

BACKGROUND

Self-driving vehicles (which may also be referred to as robots) operate in a wide variety of environments, including warehouses, manufacturing facilities, medical facilities, and the like. Such environments place a wide variety of demands on the capabilities of the self-driving vehicles and their control systems. Further, such environments may not be safe for human operators or spectators, may be difficult to travel quickly to, and may be impractical to recreate for demonstration purposes, for instance because of the above-mentioned safety risks, limitations in available space, and the like.

SUMMARY

An aspect of the specification sets out a system for remote viewing and control of self-driving vehicles, comprising: an execution subsystem for deployment at an execution location containing a self-driving vehicle, the execution subsystem including: (i) a capture assembly configured to capture multimedia data depicting the execution location; (ii) a server configured to receive the multimedia data and to transmit the multimedia data for presentation at an operator location remote from the execution location; the server further configured to relay operational commands and operational status data between the self-driving vehicle and the operator location; and an operator subsystem for deployment at the operator location, the operator subsystem including: (i) a display assembly; and (ii) a computing device configured to: (a) establish a connection with the server; (b) receive the multimedia data from the server and control the display assembly to present the multimedia data; and (c) receive the operational commands and transmit the operational commands to the server for execution by the self-driving vehicle A further aspect of the specification sets forth a method for remote viewing and control of self-driving vehicles, comprising: at an execution location containing a self-driving vehicle, controlling a capture assembly of an execution subsystem to capture multimedia data depicting the execution location; transmitting the multimedia data from a server of the execution subsystem, for presentation at an operator location remote from the execution location; at a computing device of an operator subsystem at the operator location, establishing a connection with the server, receiving the multimedia data from the server and controlling a display assembly of the operator subsystem to present the multimedia data; at the computing device, receiving operational commands and transmitting the operational commands to the server; at the server, receiving the operational commands and deploying the operational commands to the self-driving vehicle.

BRIEF DESCRIPTIONS OF THE DRAWINGS

Embodiments are described with reference to the following figures, in which.

DETAILED DESCRIPTION

Figure 1:
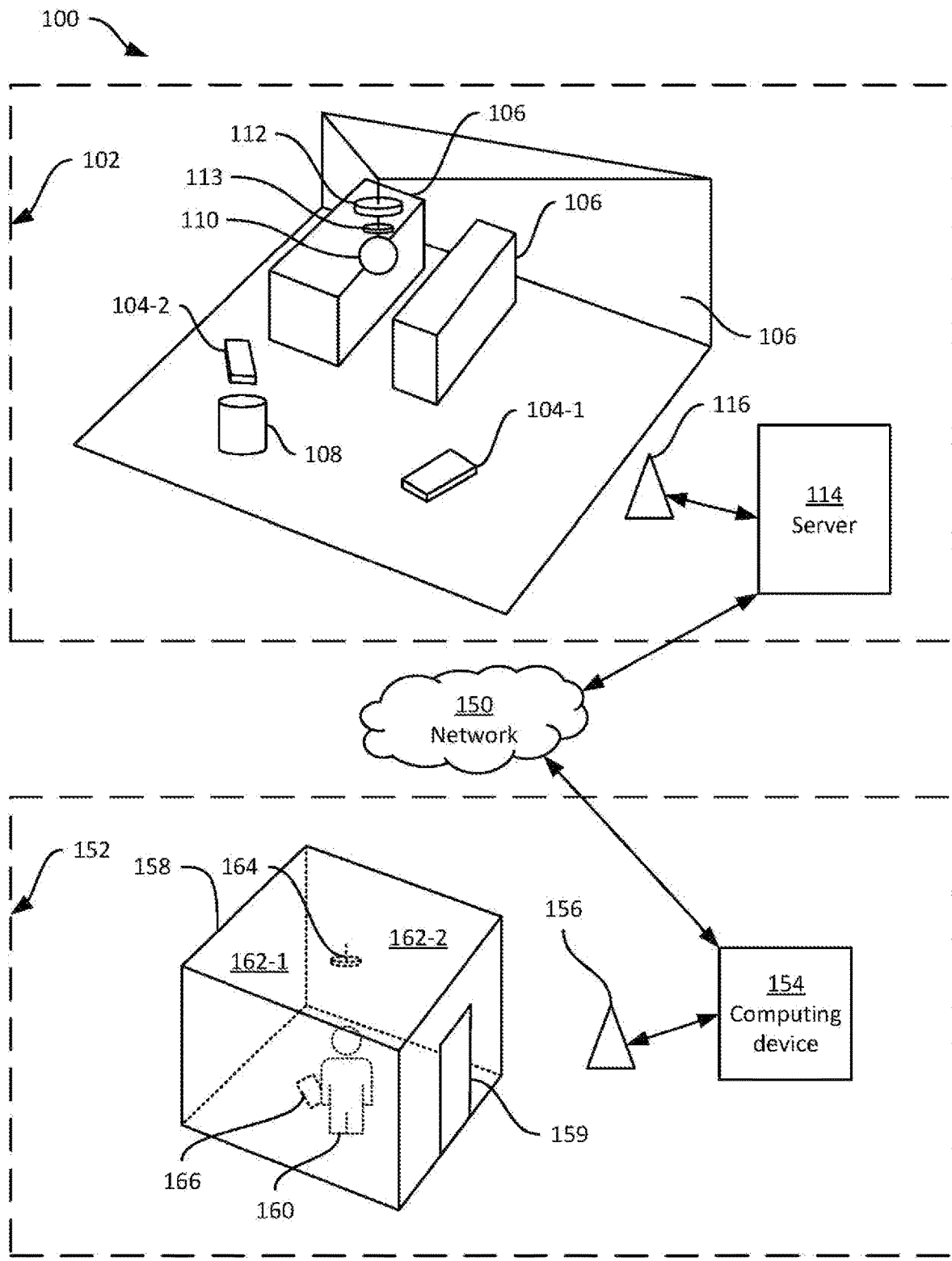
FIG. 1 depicts a system for remote viewing and control of self-driving vehicles.

FIG. 1 depicts a system 100 for remote viewing and control of self-driving vehicles. As will be apparent in the discussion below, the system 100 is configured to permit substantially real-time control and viewing of self-driving vehicles at distinct locations remote from one another. That is, an operator may be placed at a first location and input commands for controlling the self-driving vehicles, while the vehicles themselves may be deployed at one or more distinct locations, without line-of-sight to the location of the operator and without directly communications connectivity to the location of the operator (that is, the operator and the self-driving vehicles are typically not on the same network). The system 100 thus enables the operator to issue commands substantially in real-time to a live self-driving vehicle (or fleet thereof) and view the execution of such commands, without being co-located with the vehicle(s).

In particular, the system 100 includes an execution subsystem for deployment at an execution location 102. The location 102 may be in a warehouse or other facility in which one or more self-driving vehicles (e.g. vehicles 104-1, 104-2 as shown in FIG. 1) are deployed. A greater or smaller number of self-driving vehicles 104 may be deployed at the location 102 than the two shown in FIG. 1. As will be apparent, the vehicles 104 are configured to receive and execute commands, such as commands to travel to a specified position within the location 102, commands to perform various actions within the location 102, and the like. The vehicles 104 are further configured to execute such commands substantially autonomously, for example by maintaining a map of the location 102, generating a path (based on the above-mentioned map) to travel through the location 102, and controlling locomotion hardware to travel along the path. As will be apparent to those skilled in the art, the vehicles 104 are also configured to maintain various operational status data. Operational status data includes, for example, fuel, battery or other energy levels, as well as a location of the given vehicle 104 in a predefined frame of reference established within the location 102. The status data can also include a representation of the current path along which the vehicle 104 is travelling (e.g. as a series of locations in the above-mentioned frame of reference), as well as the current command being executed by the vehicle 104. As will be discussed below, the vehicles 104 can be configured to transmit at least a portion of the status data for viewing by an operator.

The location 102 may include various obstacles through which the vehicles 104 are configured to navigate, including stationary obstacles 106 (e.g. fixed shelving, walls and the like) and movable obstacles 108 (e.g. humans, movable shelving, other vehicles such as human-operated forklifts and the like). The execution subsystem includes a capture assembly configured to capture multimedia data depicting the execution location 102 and any vehicles 104 located therein. In the present example, the capture assembly includes a camera, such as a 360-degree camera 110. The camera 110 is shown suspended from a ceiling or other structure within the execution location 102, but in other examples may be supported in any suitable manner. The capture assembly also includes, in the present example, a microphone 112 for capturing audio in the execution location 102. In other examples, the microphone 112 may be omitted. Also shown in FIG. 1 is an activity indicator 113, such as a light, controllable to indicate when the multimedia data captured by the capture assembly is being viewed at another location.

A variety of other capture assemblies can be deployed in other examples. For example, the capture assembly can include a plurality of 360-degree cameras. In further examples, the camera 110 can be supplemented or replaced with one or more cameras having fields of view smaller than 360 degrees. In further examples, the camera 110 can be supplemented or replaced with one or more cameras which are enabled to capture depth data. For example, an array of such cameras (not shown) may be placed around the perimeter of the location 102 to capture the location 102. As will now be apparent, similar variations may also be implemented with respect to the microphone 112; for example, an array of microphones (not shown) may be deployed around the perimeter of the location 102, in addition to or instead of the microphone 112 shown in FIG. 1. The execution subsystem may also include one or more speakers, for example to play back audio received from an operator location.

The above-mentioned multimedia data therefore includes at least a sequence of video frames depicting the location 102. The multimedia data also includes, in the present example, an accompanying audio stream captured by the microphone 112. The execution subsystem also includes a server 114. In the present example, the server 114 is deployed at the location 102; in other examples, however, the server 114 need not be co-located with the remaining components of the execution subsystem.

The server 114 is connected with the components of the capture assembly via any suitable communications links. For example, the camera 110 and the microphone 112 may be connected to the server 114 via any suitable wired connections (not shown). In other examples, the capture assembly can be connected to the server 114 wirelessly, for example via an access point 116 hosting a wireless local-area network (WLAN) within the location 102. A plurality of access points 116 may be deployed to provide the WLAN, as required depending on the size and physical configuration of the location 102 (e.g. additional access points may be necessary to overcome interference from the obstacles 106).

The vehicles 104 are also in communication with the server 114, for example via wireless links (not shown) established between the vehicles 102 and the access point 116. Via such links, the vehicles 104 are configured to report the above-mentioned status data to the server 114, and are also configured to receive commands for execution from the server 114. The server 114 in turn, as will be seen below, receives such commands from a distinct location.

The server 114 is configured to receive the multimedia data depicting the location 102 from the capture assembly (e.g. from the camera 110 and the microphone 112). The server 114 is further configured to transmit the multimedia data, substantially in real time, via a network 150, for presentation at an operator location 152. The operator location 152 is remote from the execution location 102, in that there is no line of sight between the locations 102 and 152, and in that the location 152 is not connected to the access point 116 but must rather be connected to the location 102 via the network 150. The network 150 is a wide area network (WAN) or combination of WANs, such as the Internet, mobile networks (e.g. GSM, LTE) and the like.

The server 114 is also configured to relay operational commands from the location 152 to the vehicles 104, and status data from the vehicles 104 to the location 152. More specifically, the server 114 is connected, via the network 150, to a computing device 154 deployed at the operator location 152. The computing device 154 is a component of an operator subsystem in the system 100, and is configured to receive the multimedia data from the server 114 and to control a display assembly to present the multimedia data. Control of the display assembly may be implemented wirelessly (e.g. via an access point 156) or over wired links between the computing device 154 and the display assembly.

In the present example, the display assembly includes an enclosure 158 with an entryway 159 (e.g. a door), in which an operator 160 is positioned to issue commands to the vehicles 104 at the location 102. The enclosure 158 may be, for example, a booth at a trade show or any other suitable location remote from the location 102. The display assembly includes any one of, or any suitable combination of, displays and projectors configured to present images on the interior walls of the enclosure, of which two are labelled 162-1 and 162-2. For example, the display assembly can include a ceiling-mounted projector array 164 having five projectors, configured to project images on the four walls and the floor of the enclosure 158. The array 164 can also include one or both of a speaker and a microphone.

In further examples, the display assembly can include a projector array distributed throughout the enclosure 158 so as to project images onto the floor, walls and ceiling of the enclosure 158. In general, the display assembly is controllable by the computing device 154 to present the multimedia data (or at least a portion thereof) inside the enclosure for viewing by the operator 160. Various display assemblies will occur to those skilled in the art that are suitable for such presentation, including, for example, the Cave Automatic Virtual Environment (CAVE™) system produced by Christie™ Digital Systems.

The operator subsystem also includes an input device operable by the operator 160 to receive operational commands from the operator 160 for transmission, via the computing device 154 and the network 150, to the server 114. The server 114 is then configured to execute the commands. In some cases, the server 114 may execute the commands based on predetermined logic. In other cases, the server 114 may simply relay the commands to the relevant vehicle 104 for execution. In the present example, the input device is deployed as a component of a command device 166 (e.g. a tablet computer) connected to the computing device 154 via the access point 156. The command device 166 also includes a display device, and is configured to present some or all of the status data received at the computing device 154 from the server 114. In other examples, the tablet computer 116 can be replaced by any other suitable command device permitting the input of operational commands and preferably the display of status data from one or more vehicles 104.

Figure 2A:
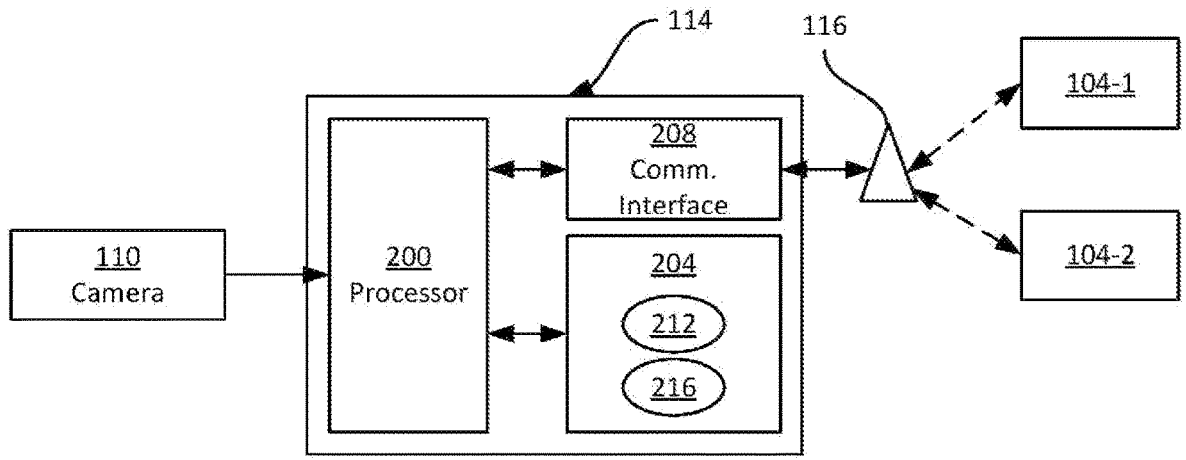
FIG. 2A depicts certain internal components of the system of FIG. 1 in accordance with an example embodiment.
Figure 2B:
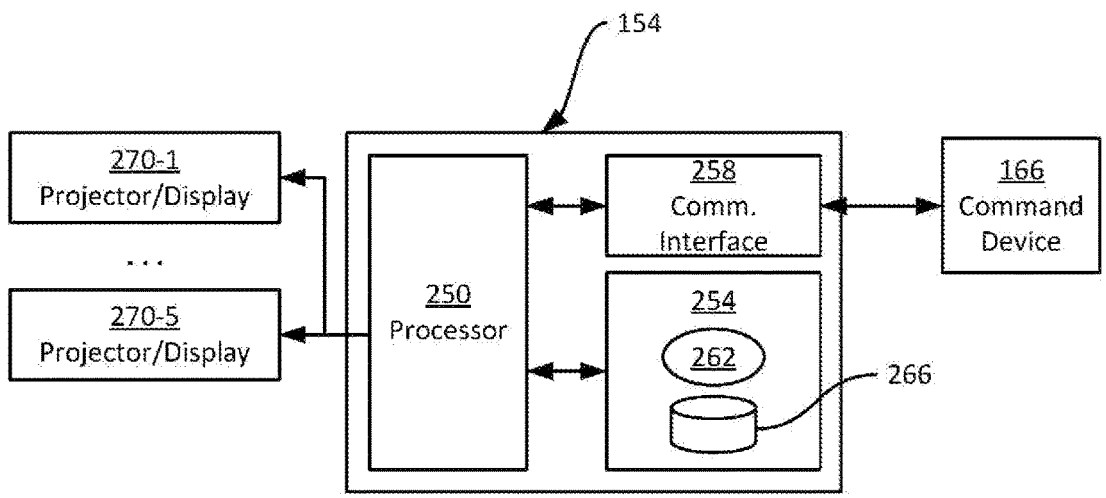
FIG. 2B depicts certain internal components of the system of FIG. 1 in accordance with another example embodiment.

Turning to FIGS. 2A and 2B, certain components of the server 114 and the computing device 154, respectively, are shown. Referring to FIG. 2A in particular, the server 114 includes at least one processor 200, such as a central processing unit (CPU) or the like. The processor 200 is interconnected with a non-transitory computer-readable medium such as a memory 204. The processor 200 and the memory 204 are generally comprised of one or more integrated circuits (ICs), and can have a variety of structures, as will now occur to those skilled in the art (for example, more than one CPU can be provided). The memory 204 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

The processor 200 is also interconnected with a communications interface 208. The communications interface 208 allows the server 114 to connect with other computing devices (e.g. the onboard computing devices of the self-driving vehicles 104 via the access point 116, and the computing device 154 via the network 150). The communications interface 208 therefore includes any necessary hardware (e.g. network interface controllers (NICs), radio units, and the like) to communicate via the access point 116 and the network 150. The server 114 can also include input and output devices, such as keyboards, mice, displays, and the like (not shown).

The memory 204 stores a plurality of computer-readable programming instructions, executable by the processor 200, in the form of various applications, including a fleet control application 212 and a remote operation application 216. As will be understood by those skilled in the art, the processor 200 can execute the instructions of the applications 212 and 216 (and any other suitable applications) in order to perform various actions defined within the instructions. In the description below, the processor 200, and more generally the server 114, are said to be configured to perform those actions. It will be understood that they are so configured via the execution (by the processor 200) of the instructions of the applications stored in memory 204.

Turning to FIG. 2B, the computing device 154, which may be implemented for example as a desktop computer co-located with the enclosure 158, includes at least one processor 250 such as a central processing unit (CPU). The processor 250 is interconnected with a non-transitory computer-readable medium such as a memory 254. The processor 250 and the memory 254 are generally comprised of one or more integrated circuits (ICs), and can have a variety of structures, as will now occur to those skilled in the art (for example, more than one CPU can be provided). The memory 254 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

The processor 250 is also interconnected with a communications interface 258. The communications interface 258 allows the computing device 154 to connect with other computing devices (e.g. the server 114 via the network 150, and the command device 166 via the access point 156). The communications interface 258 therefore includes any necessary hardware (e.g. network interface controllers (NICs), radio units, and the like) to communicate via the access point 156 and the network 150. The computing device 154 can also include input and output devices beyond those of the command device 166 and of the display assembly mentioned earlier, such as keyboards, mice, displays, and the like (not shown).

The memory 254 stores a plurality of computer-readable programming instructions, executable by the processor 200, in the form of various applications, including a remote operation application 262. As will be understood by those skilled in the art, the processor 200 can execute the instructions of the application 262 (and any other suitable applications) in order to perform various actions defined within the instructions. In the description below, the processor 200, and more generally the computing device 154, are said to be configured to perform those actions. It will be understood that they are so configured via the execution (by the processor 200) of the instructions of the applications stored in memory 254. The memory 254 also stores a repository 266 containing connection parameters and display parameters corresponding to the execution location 102, as will be discussed below in greater detail.

Also shown in FIG. 2B are one or more projectors or displays 270-1 through 270-5, each configured to project or otherwise display a portion of the multimedia data received from the server 114 on a corresponding surface within the enclosure 158. For example, each of the projectors 270 may be assigned to one of the four walls or the floor of the enclosure 158. The processor 200 is configured to process the multimedia data for presentation via the projectors 270, according to the parameters in the repository 266.

Figure 3:
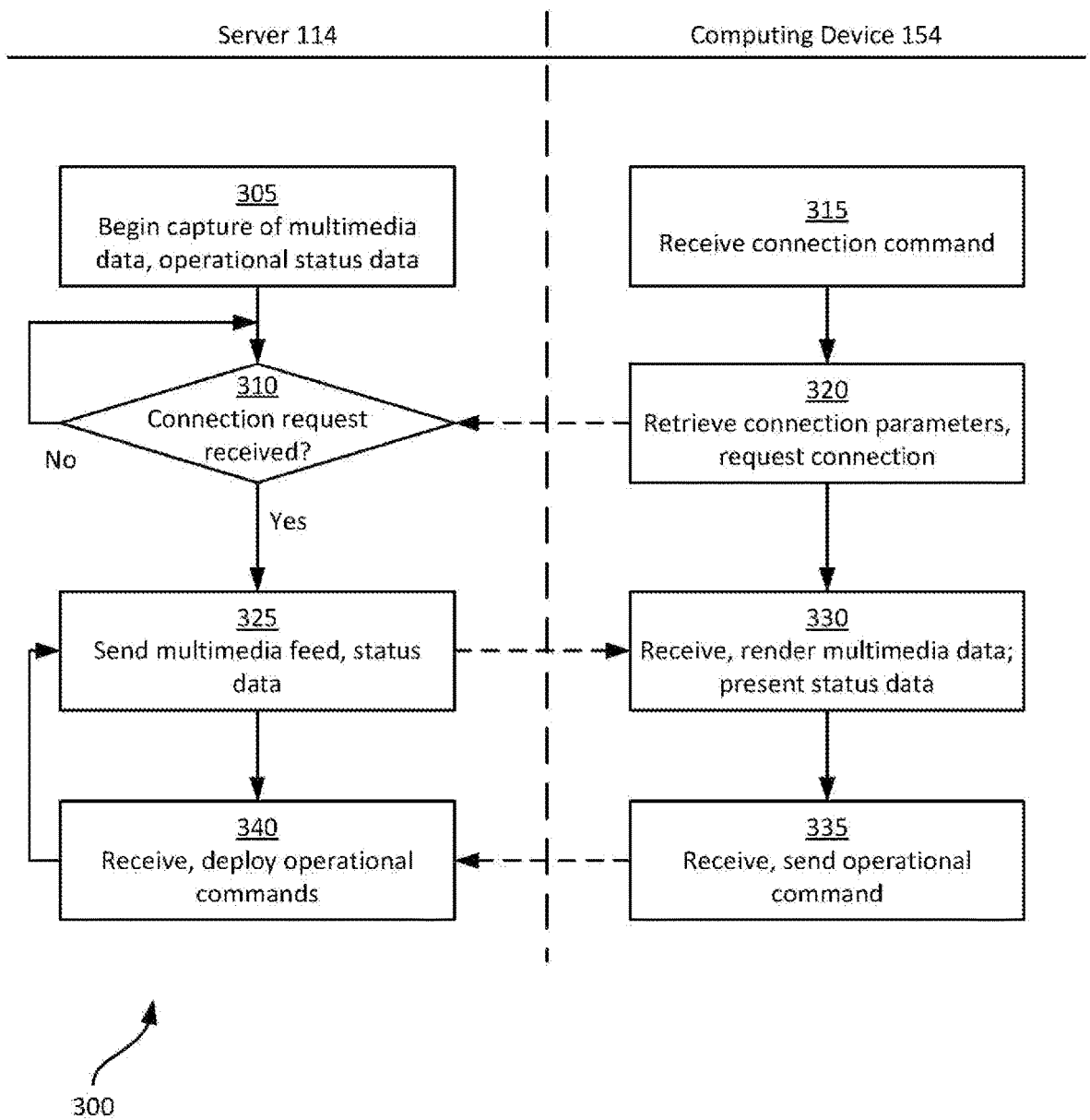
FIG. 3 depicts a method for remote viewing and control of self-driving vehicles.

Turning to FIG. 3, a method 300 for remote viewing and control of self-driving vehicles is illustrated. The method 300 will be described in conjunction with its performance in the system 100 described above. In particular, certain blocks of the method 300 will be described below as performed by the server 114, while other blocks of the method 300 will be described as being performed by the computing device 154.

At block 305, the server 114 is configured to begin capturing multimedia data via the execution of the application 216. In particular, the processor 200 is configured to control the capture assembly (e.g. the camera 110 and microphone 112). The server 114 is also configured to collect operational status data from the vehicles 104 present in the location 102, e.g. via the execution of the application 212. The operational status data may be captured by issuing requests to the vehicles 104 via the access point 116. In other examples, the vehicles 104 are configured to report the status data to the server 114 automatically (i.e. without awaiting requests). The status data includes any one or more of an identifier of the relevant vehicle 104 (to distinguish the vehicles 104 from one another) energy level indicators (e.g. battery level), a location of the vehicle 104 within the location 102, a current task under execution by the vehicle 104, a current path under execution by the vehicle 104, an operational status of the vehicle 104 (e.g. idle, charging, and the like). Other types of status data will also occur to those skilled in the art.

The server 114 is configured to store the multimedia data and status data in the memory 204. The multimedia data may be stored, for example, only for a predetermined period of time, and discarded following the period of time (whether or not the data has been sent to the computing device 154). The status data is periodically updated, as further data is received from the vehicles 104.

At block 310, the server 114 is configured to determine whether a connection request has been received from a computing device at an operator location, such as the computing device 154. When the determination at block 310 is negative, the server 114 is configured to continue collecting multimedia and status data, while awaiting a connection request. In other examples, the performance of block 305 may be delayed until after a connection request has been received (i.e. an affirmative determination at block 310).

A connection request is initiated by the computing device 154 via the performance of block 315. At block 315, the computing device 154 is configured to receive a connection command, for example from the command device 166. The command device 166 may be configured to present a selectable element on a display thereof for initiating a connection between the computing device 154 and the server 114. In other examples, the connection command is received from an input device such as a keyboard and/or mouse connected to the computing device 154. In any event, the connection command includes a selection of the server 114. At block 320 the computing device 154, via execution of the application 262, is configured to retrieve, from the repository 266, connection parameters corresponding to the server 114 (that is, to the execution subsystem at the location 102). The connection parameters may include any one or more of domain name, a network address (e.g. an IP address), authentication credentials, and the like.

Having retrieved the connection parameters corresponding to the server 114, the computing device 154 is configured to transmit a connection request to the server 114 via the network 150 according to the connection parameters. The server 114 and the computing device 154 are configured to establish a connection over the network 150 according to suitable protocol or combination thereof suitable for conveying the multimedia and status data to the computing device, as well as for conveying control data to the server 114 (e.g. the session description protocol, SDP). When the connection has been established, at block 325 the server 114 is configured to transmit current multimedia data and status data to the computing device 154. The server 114 can also be configured to enable the activity indicator 113, indicating that the execution subsystem at the location 102 is now live. When the execution subsystem includes a speaker, the server 114 can also be configured to play a pre-recorded message announcing that the execution subsystem is now active (i.e. is recording and sending multimedia data and status data to the operation subsystem).

At block 330, the computing device 154 is configured to receive the multimedia data and the status data, and to present at least a portion of the multimedia data via the display assembly (e.g. the projectors 270). The computing device 154 is configured to present the multimedia data by retrieving display parameters corresponding to the execution location 102 from the repository 266. The display parameters are preconfigured and define any transformations necessary between the image space of the multimedia data (e.g. the coordinates established by the camera 110) and the display assembly (e.g. the coordinate systems of each of the projectors 270). The display parameters may therefore identify portions of each video frame in the multimedia data to be displayed at each projector 270, as well as any transformations (e.g. skewing, scaling and the like) to be applied to the portions prior to rendering via the corresponding projector 270.

At least a portion of the status data received at block 330 can also be presented via one or both of the display assembly and the command device 166. For example, a listing of identifiers of vehicles 104 may be transmitted to the device 166 for display thereon. Other status data may also be presented either at the device 166 or via the display assembly, including any or all of the above-mentioned status data (e.g. energy levels, locations and the like).

Figure 4:
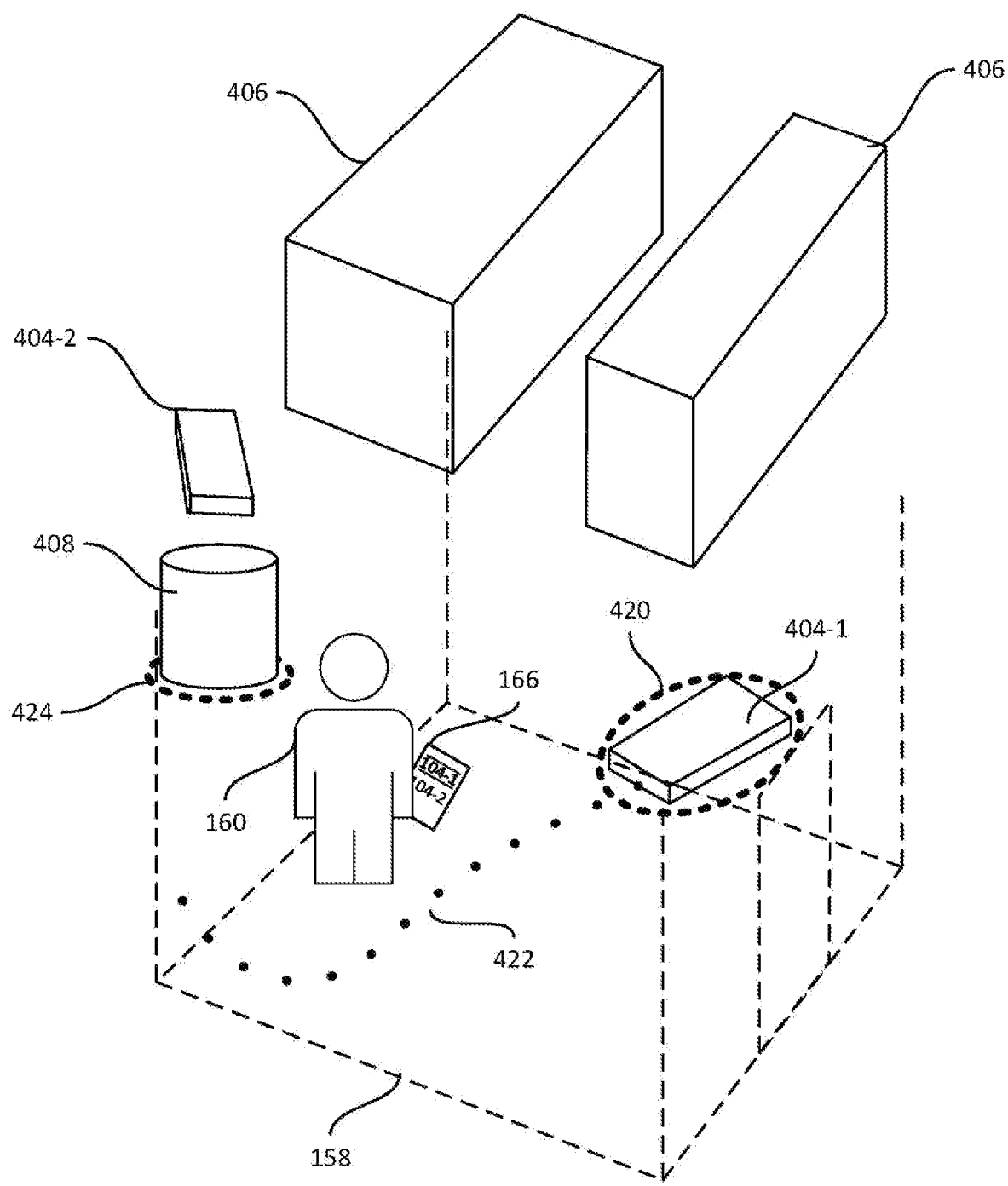
FIG. 4 depicts the performance of block 330 of the method of FIG. 3.

Referring to FIG. 4, the performance of block 330 is illustrated, in which the multimedia data is rendered on the interior walls of the enclosure 158 via the projectors 270 (not shown). Thus, representations 404-1 and 404-2 of the vehicles 104 are visible in the current positions of the vehicles 104 themselves at the location 102. Similarly, representations 406 and 408 of the obstacles 106 and 108, respectively, are visible from within the enclosure 158 in their current positions at the location 102.

The performance of block 330 can also include the generation of overlay data at the computing device 154 for presentation via the display assembly along with the multimedia data. For example, an overlay 420 highlighting the vehicle 104-1 (more specifically, the representation 404-1 of the vehicle 104-1) is shown, and a further overlay 422 is shown, projected onto both the floor and an interior wall of the enclosure 158, indicating the path currently being executed by the vehicle 104-1 (e.g. as a result of an earlier operational command issued from the command device 166). Other overlays, such as an overlay 424 highlighting the obstacle 408, may also be presented via the projectors 270.

The above-mentioned overlays may be generated by the computing device 154 based on the status data received from the server 114. For example, the server 114 can be configured to transmit status data to the computing device 154 including the locations of the vehicles 104 and obstacles 106, 108 in a predefined frame of reference established at the location 102. In such embodiments, the parameters stored in the repository 266 also define a mapping between the frame of reference at the location 102 and the capture assembly. In other examples, the computing device 154 can be configured to detect certain objects (e.g. the vehicles 104 and obstacles 106 and 108) in the multimedia data, based on predefined image characteristics, machine-readable graphics placed on the objects and detectable by the computing device 154 in the multimedia data, or the like.

As seen in FIG. 4, the representation 404-2 has not been rendered with an overlay. Although in some examples, all vehicle representations 404 may be rendered with such overlays, in the illustrated example an overlay is rendered only for one of the vehicles 104 selected via the command device 166 (as illustrated in FIG. 4, the vehicle identifier "104-1" is shown as having been selected on the device 166). The selection of a vehicle 104 may precede the issuance of an operational command to that vehicle 104.

Returning to FIG. 3, at block 335 the computing device 154 is configured to receive an operational command and transmit the operational command to the server 114 over the previously established connection. The server 114, in turn, is configured to either execute the operational command independently via execution of the application 212 or to relay the operational command to the relevant vehicle 104 via execution of the application 212. In the case that server 114 is executing the operational command independently, it may also originate new commands local to the location 102 which are then sent to the relevant vehicle or vehicles 104. Operational commands may be received at the computing device 154, for example, from the command device 166. For example, following selection of one of the available vehicles 104 presented at the command device 166 (e.g. the list of vehicles 104-1 and 104-2 shown on the device 166 in FIG. 4), the command device 166 may present a plurality of selectable operational commands. A variety of operational commands may be presented for selection, including commands to travel to a selected location (e.g. selected on the map mentioned earlier), commands to perform a certain action (e.g. return to a charging station, retrieve an object at a given location) and the like.

When an operational command is received, the computing device 154 is configured to transmit the operational command to the server 114. The command transmitted to the server 114 includes one or more parameters defining the command (e.g. a location, an action, or the like) and may include at least an identifier of the vehicle 104 to which the command is directed.

At block 340, the server 114 is configured to receive any operational commands from the computing device 154 and to either deploy the operational command(s) to the relevant vehicles 104 identified in the operational commands or to execute the fleet management application 212 which then locally generates operational commands for a subset of the vehicles 104, as will be apparent to those skilled in the art. The server 114 then returns to block 325, at which further multimedia data and status data (now reflecting the performance of a task corresponding to any recently deploying operational command) are collected and transmitted to the computing device 154.

As will be apparent, it is not necessary for operational commands to be received and deployed for further multimedia and status data to be transmitted and displayed. That is, the transmission and presentation of multimedia and status data at blocks 325 and 330 continues, substantially in real time, independently of the transmission and execution of operational commands at blocks 335 and 340.

The performance of blocks 325, 330, 335 and 340 continues until the connection established above is interrupted. Following disconnection of the execution and operator subsystems, the server 114 may be configured to disable the indicator 113. The computing device 154, meanwhile, is configured to cease presentation of the multimedia data via the display assembly. The display assembly may simply be disabled, or a previously stored set of images, video or the like (i.e. stored in the memory 254) may be presented via the display assembly until the connection is re-established, or until a connection with a further execution subsystem is established.

Figure 5:
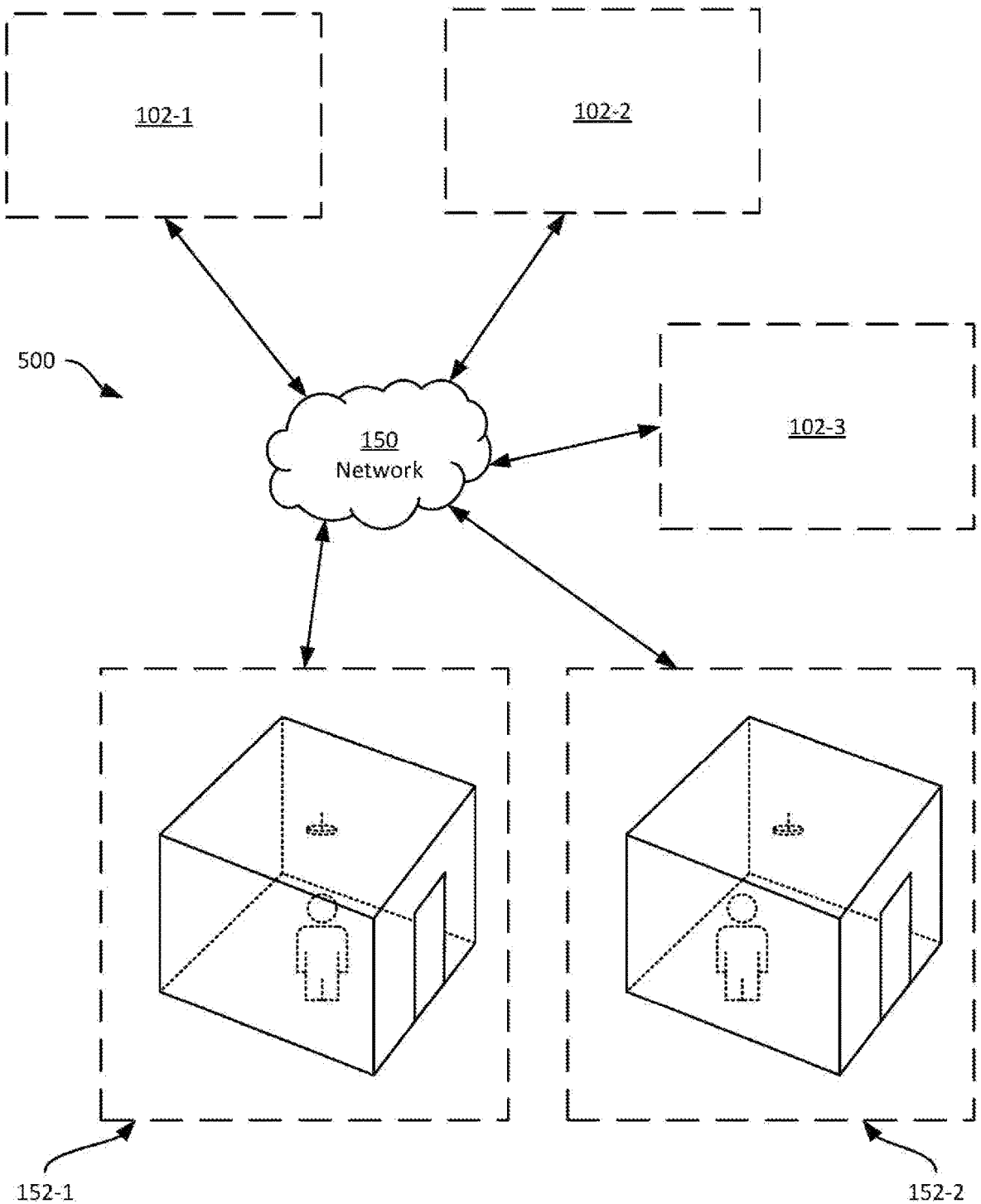
FIG. 5 depicts a system for remote viewing and control of self-driving vehicles, according to a further embodiment.

Turning to FIG. 5, a further system 500 is illustrated, including a plurality of execution locations 102-1, 102-2, 102-3 and a plurality of operator locations 152-1, 1522. The system 500 may include greater or smaller numbers of execution locations 102 and operator locations 152. Each execution location 102 includes a corresponding execution subsystem, and each operator location includes a corresponding operator subsystem. The servers 114 of the locations 102, and the computing devices 154 of the locations 152, are each connected to the network 150. Any pair of a server 114 and a computing device 154 can establish a connection over the network 150 for exchanging multimedia and status data, as well as operational commands, as described above.

Each computing device 154 in the system 500 can store connection parameters for each of the execution subsystems (i.e. for each of the servers 114 in the system 500). Prior to performance of block 315, the command device 166 can be configured to present a list of available execution locations 102 represented in the repository 266, and to send a connection request to the selected location 102. The above-mentioned list may simply be a list of each set of connection parameters stored in the repository 266. In other examples, the computing device 154 is configured to send an availability request to each server 114 represented in the repository 266, to determine whether the corresponding server 114 is currently connected to another computing device 154, or whether the corresponding server 114 is available.

Figure 6:
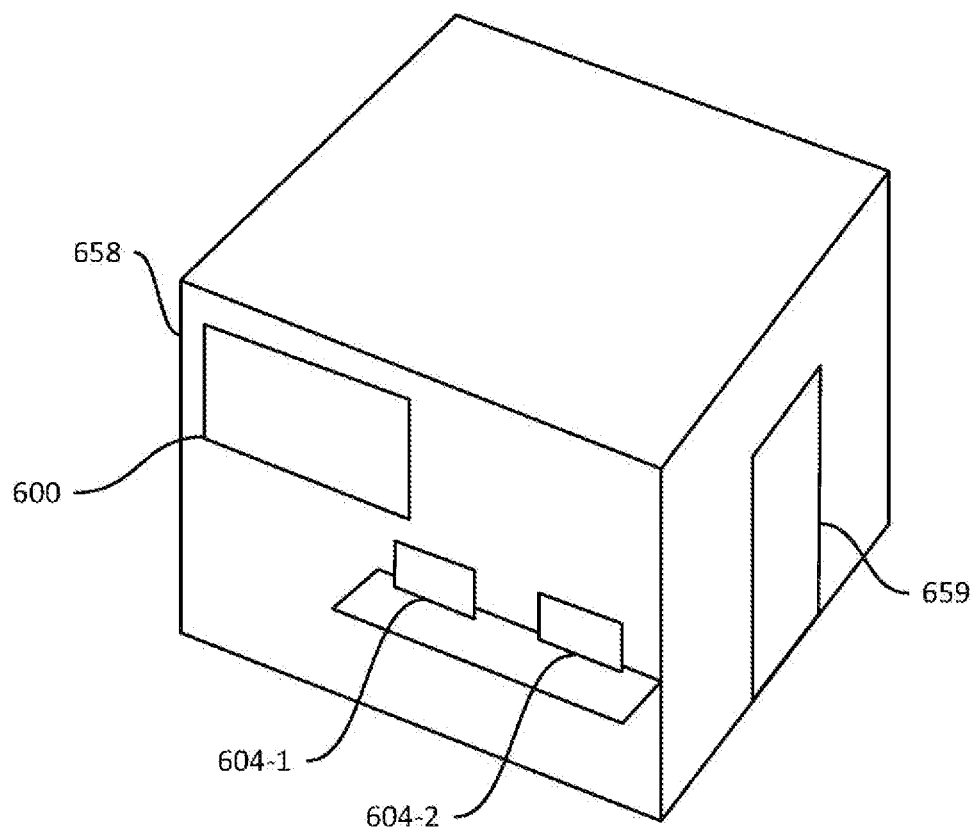
FIG. 6 depicts an operator subsystem of the system of FIG. 1, according to a further embodiment.

Turning to FIG. 6, in some examples the display assembly can include additional displays or projectors external to the enclosure 158. For example, in FIG. 6 an enclosure 658 is illustrated (having a door or other entryway 659); the enclosure 658 contains one or more displays or projectors as described above. The enclosure 658 also supports, on the exterior walls thereof, an auxiliary display 600 and at least one control terminal 604 (two control terminals 604-1 and 604-2 are shown). The computing device 154 associated with the enclosure 658 is configured, in addition to the rendering activities within the enclosure 658 as described above, to display a predetermined portion of the multimedia data received from the server 114 at the display 600. For example, the display 600 may present an overhead view of the location 102 extracted from the multimedia data received from the server 114. Further, the computing device 154 can be configured to present additional portions (either the same portion or different portions) of the multimedia data at the terminals 604. The terminals 604 may also include input devices enabling the terminals 604 to issue operational commands to a fleet manager application 212 or vehicle or vehicles 104 located in one of the locations 102, as described above in connection with the command device 166.

Variations to the above systems and methods are contemplated. For example, the operator subsystem can also include one or more position tracking assemblies (e.g. IR-based motion capture systems) to detect the position of the operator 160 within the enclosure 158. The position of the operator 160 may be employed by the computing device 154 to update the presentation of multimedia data via the display assembly, for example to compensate for portions of the walls or floor of the enclosure 158 being occluded by the operator 160. In further embodiments, the enclosure 158 may be substituted with one or more virtual-reality displays, such as a head-mounted pair of displays worn by the operator 160.

Those skilled in the art will appreciate that in some embodiments, the functionality of any one or more of the applications 212, 216 and 262 may be implemented using pre-programmed hardware or firmware elements (e.g., application specific integrated circuits (ASICs), electrically erasable programmable read-only memories (EEPROMs), field-programmable gate arrays (FPGAs) etc.), or other related components.

The scope of the claims should not be limited by the embodiments set forth in the above examples, but should be given the broadest interpretation consistent with the description as a whole.

The invention claimed is:

1. A system for remote viewing and control of one or more self-driving vehicles, the system comprising:

an execution subsystem at an execution location at which a self-driving vehicle is operating, the execution subsystem configured to:
  receive, from a capture assembly, data associated with at least one of the execution location and the self-driving vehicle; and
  transmit the data received from the capture assembly to an operator location remote from the execution location; and
an operator subsystem at the operator location, the operator subsystem comprising:
  a display assembly; and
  a processor configured to:
    receive the data from the execution subsystem;
    operate the display assembly to generate a visual representation for at least one subset of the data received from the execution subsystem, the visual representation comprising an overlay representing the self-driving vehicle; and
    transmit operational commands to the execution subsystem for execution by the self-driving vehicle.

2. The system of claim 1, wherein the data received from the capture assembly data is associated with a location of at least one of the self-driving vehicle and one or more obstacles at the execution location.

3. The system of claim 2, wherein the processor is configured to automatically identify the location of the at least one of the self-driving vehicle and the one or more obstacles from the data received from the capture assembly.

4. The system of claim 2, wherein the processor is configured to generate the visual representation by applying a transformation between coordinates corresponding to the location of the at least one of the self-driving vehicle and the one or more obstacles, and coordinates corresponding to the display assembly at the operator location.

5. The system of claim 1, wherein the data from the execution subsystem comprises a status data associated with the one or more self-driving vehicles.

6. The system of claim 1, wherein the capture assembly comprises a camera.

7. The system of claim 1, wherein the operator subsystem comprises an operator enclosure for supporting the display assembly.

8. The system of claim 1, wherein the display assembly comprises a plurality of display devices operable by the processor for presenting the at least one subset of the data.

9. The system of claim 1, wherein the visual representation comprises an overlay representing a path being executed by the self-driving vehicle.

10. A method for remote viewing and control of one or more self-driving vehicles, the method comprising:
  at an execution location at which a self-driving vehicle is operating, controlling a capture assembly of an execution subsystem to capture data associated with at least one of the execution location and the self-driving vehicle;
  receiving, at the execution subsystem, the data associated with the at least one of the execution location and the self-driving vehicle;
  transmitting the data associated with the at least one of the execution location and the self-driving vehicle to an operator location remote from the execution location; and
  at an operator subsystem at the operator location, operating a processor to:
    receive the data from the execution subsystem;
    operate the display assembly to generate a visual representation for at least a subset of the data received from the execution subsystem, the visual representation comprising an overlay representing the self-driving vehicle; and
    transmit operational commands to the execution subsystem for execution by the self-driving vehicle.

11. The method of claim 10, wherein the data received from the capture assembly data is associated with a location of at least one of the self-driving vehicle and one or more obstacles at the execution location.

12. The method of claim 11, wherein the processor is configured to automatically identify the location of the at least one of the self-driving vehicle and the one or more obstacles from the data received from the capture assembly.

13. The method of claim 11, wherein the processor is configured to generate the visual representation by applying a transformation between coordinates corresponding to the location of the at least one of the self-driving vehicle and the one or more obstacles, and coordinates corresponding to the display assembly at the operator location.

14. The method of claim 10, wherein the data from the execution subsystem comprises a status data associated with the one or more self-driving vehicles.

15. The method of claim 10, wherein the capture assembly comprises a camera.

16. The method of claim 10, wherein the operator subsystem comprises an operator enclosure for supporting the display assembly.

17. The method of claim 10, wherein the display assembly comprises a plurality of display devices operable by the processor for presenting the at least one subset of the data.

18. The method of claim 10, wherein the visual representation comprises an overlay representing a path being executed by the self-driving vehicle.

* * * * *